Dec. 21, 1954 J. G. O'NEIL 2,697,385
CONTAINER-FORMING APPARATUS
Filed June 7, 1952 3 Sheets-Sheet 1
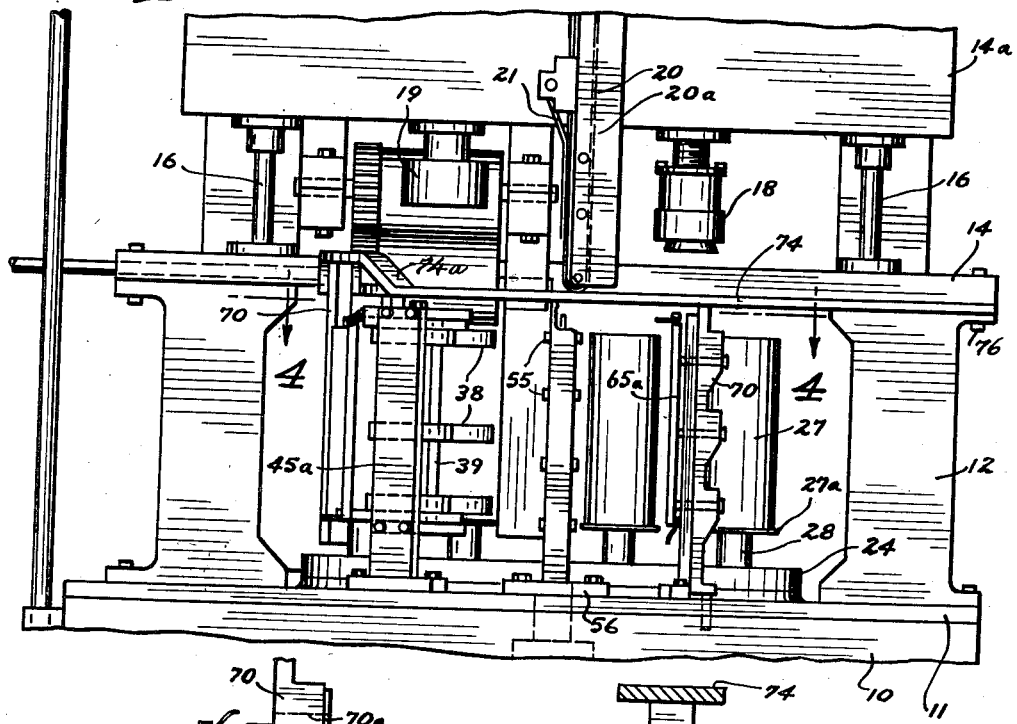
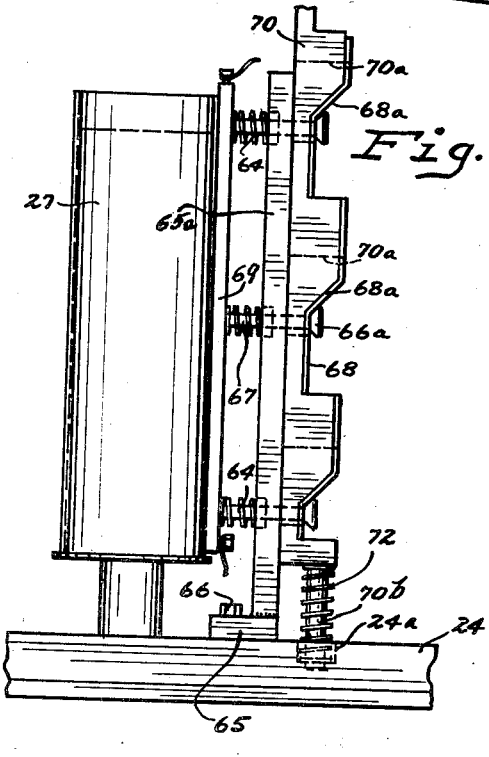
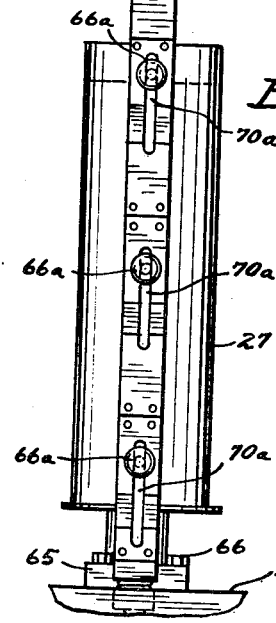
INVENTOR.
JOHN G. O'NEIL
BY Chas. C. Reif
ATTORNEY Dec. 21, 1954

J. G. O'NEIL 2,697,385

CONTAINER-FORMING APPARATUS

Filed June 7, 1952

INVENTOR.
JOHN G. O'NEIL
BY
Chas. C. Reyf
ATTORNEY

Dec. 21, 1954    J. G. O'NEIL    2,697,385
CONTAINER-FORMING APPARATUS
Filed June 7, 1952    3 Sheets-Sheet 3
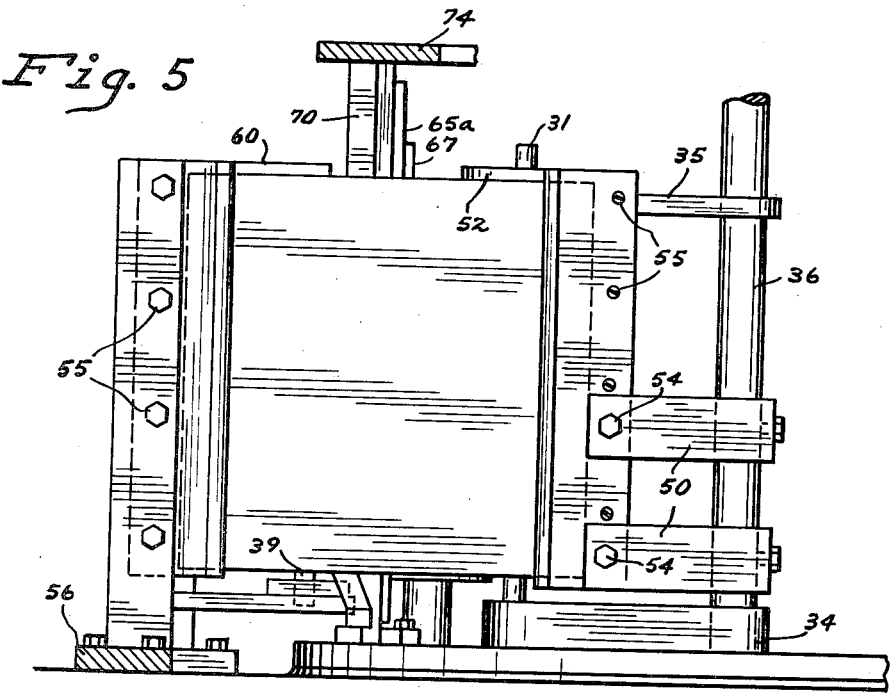
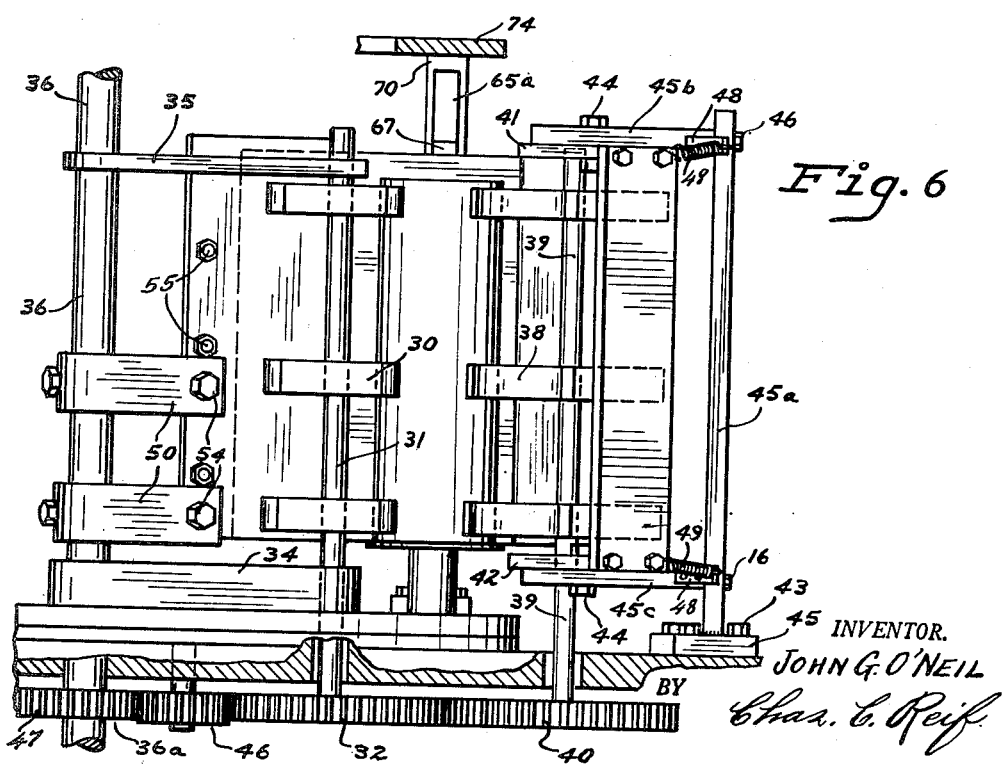
INVENTOR.
JOHN G. O'NEIL
BY Chas. C. Reif.
ATTORNEY

United States Patent Office

2,697,385
Patented Dec. 21, 1954

2,697,385

CONTAINER-FORMING APPARATUS

John G. O'Neil, Minneapolis, Minn., assignor to Weinon Corporation, St. Paul, Minn., a corporation of Minnesota Application June 7, 1952, Serial No. 292,270

14 Claims. (Cl. 93—77)

This invention relates to an apparatus or machine for making containers. Said containers are made from sheets of flexible material and while this material may be of various kinds, in practice the containers have been made of flexible sheets of strong heavy paper or cardboard.

It is an object of this invention to provide an apparatus for forming said containers about a mandrel in a rapid and efficient manner.

It is a further object of the invention to provide an apparatus comprising a mandrel movable in a circular path, a pair of spaced rotatable members having recesses in their peripheries shaped to fit about the periphery of said mandrel, means for feeding a sheet of flexible material into position at one side of said mandrel so as to be engaged and moved by said mandrel, and means for rotating said pair of members for causing the same to embrace said mandrel and press said sheet about the periphery thereof with the edges of said sheet overlapping, and a second means movable with said mandrel but movable relatively to said mandrel to engage said overlapping edges and press the same against said mandrel.

It is another object of the invention to provide an apparatus comprising a member such as a table, a series of mandrels secured to said table, said mandrels being equally and circumferentially spaced, means for intermittently rotating said table the distance between adjacent mandrels, a pair of spaced opposed rotating members having recesses in their peripheries shaped to fit about said mandrels respectively, means for feeding a substantially rectangular sheet of flexible material in front of each of said mandrels successively so that each of said sheets is engaged by said mandrel, bent partially thereabout and moved toward said pair of rotating members, means for rotating said members in synchronism with the movement of said table and mandrels so that each mandrel and sheet is moved between said members and said sheet is pressed against the periphery of said mandrels respectively by said rotatable members with the edges of said sheet overlapping, and other means carried by said table pressing the said overlapping edges together and against said mandrel.

It is more specifically an object of this invention to provide an apparatus for forming containers out of sheets of flexible material comprising a rotatable table which may rotate in a substantially horizontal plane, a series of mandrels secured to said table and extending at right angles thereto, which mandrels may be of cylindrical form, a pair of spaced opposed rotatable members having recesses in their peripheries shaped to fit about the peripheries of said mandrels, means for feeding substantially rectangular sheets of flexible material in front of said mandrels respectively so as to be engaged by said mandrels respectively and moved toward said rotatable members, means for rotating said rotatable members in synchronism with the movement of said table and mandrels so that said mandrels and sheets are successively moved between said rotatable members and said sheet is pressed against the peripheries of said mandrels respectively with its edges overlapping, and means adjacent each of said mandrels movable with said table for pressing said overlapping edges against said mandrels respectively.

These and other objects and advantages of the invention will be fully set forth in the following description made in connection with the accompanying drawings in which like reference characters refer to similar parts throughout the several views and in which:

Fig. 1 is a view in front elevation of said apparatus;

Fig. 2 is a view in side elevation of a portion of said apparatus;

Fig. 3 is a view in elevation as seen from the right of Fig. 2, an additional portion being shown in section;

Fig. 5 is a view in side elevation of the apparatus as seen from line 5—5 of Fig. 5 looking in the direction of the arrows, a portion being shown in vertical section; and Fig. 6 is a view in elevation as seen from line 6—6 of Fig. 4 looking in the direction of the arrows, with some parts broken away and some parts shown in vertical section.

Figure 4:
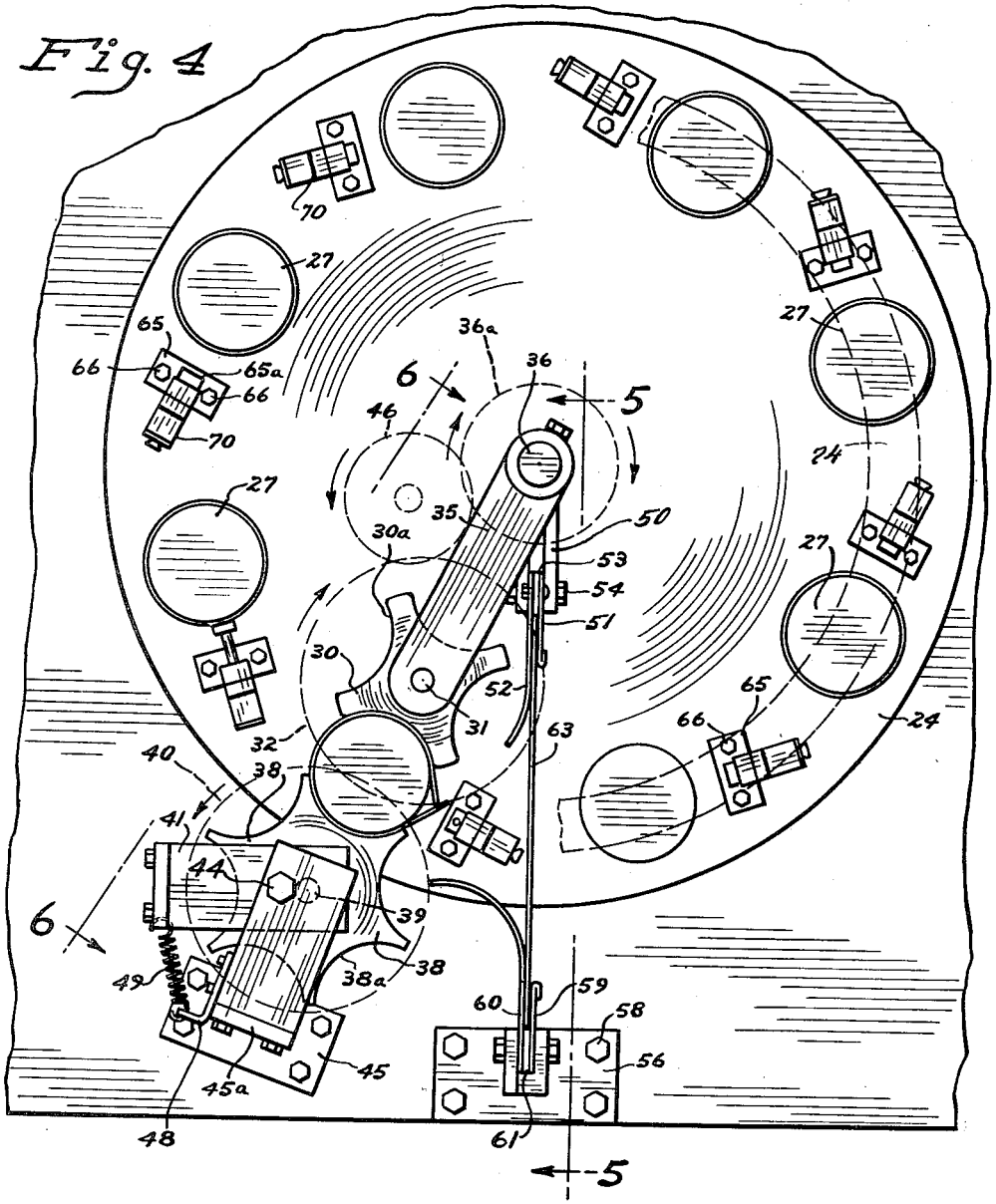
Fig. 4 is a plan view of the apparatus as seen looking downwardly from line 4—4 of Fig. 1 in the direction of the arrows.

Referring to the drawings, a machine is shown comprising a frame member 10 having a horizontal top surface to which is secured a plate 11. Standards 12 are secured to plate 11 and frame 10 and are shown as having horizontal top surfaces to which is secured a cross-head 14 having an upper portion 14a carried by suitable supports 16. Cross-head portion 14 carries a plurality of members 18, 19, etc. adapted to act on the container after it is formed about certain mandrels. The cross-head 14 and parts carried thereby form no part of the present invention and are shown and described in applicant's copending application, Serial No. 191,967, filed October 25, 1950, for "Method and Apparatus for Producing Containers." A feeding mechanism 20 is partially shown in Fig. 1, which feeding mechanism is also shown in said pending application. It may be stated that the same comprises a series of belts 20a which feed sheets of material from a magazine downwardly in the rear of a plate 21.

A table 24 is shown, and in the embodiment of the invention illustrated this table is disposed in a horizontal plane. Said table 24 has secured thereto and extending vertically therefrom a series of mandrels 27. While these mandrels might vary in shape, in the embodiment of the invention illustrated they are shown as cylindrical and said mandrels preferably have a cylindrical flange 27a at their lower ends of slightly larger diameter than the main portion of the mandrel. Said mandrels are supported on reduced portions or shafts 28 secured to table 24. Mandrels 27 are equally and circumferentially spaced about table 24.

Means are provided for intermittently rotating table 24 the distance between the axes of adjacent mandrels. This means can be the same as that shown in said copending application supra. A plurality of vertically spaced members 30 are provided, which members are rotatable and each has in its periphery a plurality of circumferentially spaced recesses 30a illustrated as semi-cylindrical. Members 30 are carried on a shaft 31 to the lower end of which is secured a gear 32. Shaft 31 is journaled in a stationary member 34 and adjacent its top is supported in a member 35, both of said members being carried by a stationary shaft or rod 36 coaxial with table 24. A plurality of vertically spaced rotatable members 38 are provided, each having in its periphery a plurality of circumferentially spaced recesses 38a also shown as semi-cylindrical in form. Members 38 are spaced from and opposed to members 30 respectively and said members are so positioned that the recesses 30a and 38a are adapted to fit about the mandrels 27 in close proximity thereto. Members 38 are secured to a shaft 39 which is journaled in vertically spaced members 41 and 42. Members 41 and 42 are oscillatable about axially aligned headed and nutted bolts 44 secured in stationary plate-like members 45b and 45c secured to a vertical member 45a forming part of a bracket 45 which is secured to plate 11 by bolts 43. Bracket 45 and members 45b and 45c have secured to one side thereof small angle brackets 48 to which are respectively secured tensile coiled springs 49, the other ends of which are secured to members 41 and 42 respectively. Shaft 39 has secured to its lower end a gear 40 meshing with gear 32. Shaft 39 and gear 40 and members 38 are thus moved toward gear 32 by the springs 49, said shaft and gear swinging with members 41 and 42 about the aligned axes of bolts 44. Said shaft 39, members 38 and gear 40 can thus move away from members 30 against the tension of springs 49. Gear 40 will not be moved sufficiently to cease meshing with gear 32.

Gears 32 and 40 have a one to one ratio. While gears 32 and 40 could be variously driven, in the embodiment of the invention illustrated they are shown as driven from an idler gear 46 which meshes with gear 32. Gear 46 also meshes with a gear 47 which is coaxial with shaft 36 and moves with table 24.

A pair of brackets 50 are secured to rod 36 and have spaced portions between which is secured a plate 51 extending toward the periphery of table 24 and shown as having its end bent reversely upon itself. Another plate 52 is secured between said portions and spaced from plate 51, the same extending some distance beyond plate 51 and having its end curved toward member 30. A spacing plate 53 is disposed between plates 51 and 52, and plates 51, 52 and 53 are clamped between the portions of brackets 50 by bolts 54. Plates 51, 52 and 53 extend upwardly and are further clamped together by a plurality of headed and nutted bolts 55.

Another bracket 56 is secured to plate 14 by a plurality of bolts 58, the same having an upstanding portion with a recess therein in which are disposed plates 59, 60 and 61. Plate 59 is shown as having its free end bent reversely upon itself. Plate 60 is spaced from plate 59 by the spacing plate 61 and extends quite a distance beyond plate 59 and is curved toward member 38. Plates 59, 60 and 61 extend some distance above bracket 56. It will be seen that plates 51 and 52 and plates 59 and 60 form spaced guideways which are in horizontal alignment. The plates 53 and 61 have portions forming bottoms for said guideways disposed in the same horizontal plane. Said guideways are adapted to receive the edge portions of a sheet 63 of flexible material from which the container is formed, which sheet is fed downwardly by the feeding means 20 from a suitable magazine. Such a magazine and feeding means are disclosed in the above mentioned copending application.

A bracket 65 is secured to table 24 adjacent each of the mandrels 27 by headed screws 66. Each bracket 65 has a vertically extending portion 65a in the form of a bar, the same having a plurality of bores extending transversely therethrough in which the members 67 are slidable. Members 67 are secured at one end to an electrode 69 which extends vertically parallel to the side of the adjacent mandrel 27. Members 67 have heads 66a at their outer ends shown as frusto-conical in form, and these engage wear plates 68 secured to a cam bar 70. Springs 64 surround members 67 and urge electrode 69 toward mandrel 27. Cam bar 70 has slots 70a therein through which members 67 pass. It will be seen that bar 70 has inclined portions which are overlaid by the similarly inclined portions 68a of plate 68, said latter inclined portions forming cam members. Bar 70 is urged to an upper position by a compression coiled spring 72 extending about a rod 70b depending from the bottom of bar 70 and having its lower end extending into table 24. The upper end of spring 72 engages the bottom of bar 70 and its lower end engages the bottom of a recess 24a in table 24. The bars 70 are adapted to move under a cam plate 74 which is suitably supported from the cross-head 14 by one or more bolts 76. Cam plate 74 has an upwardly inclined portion 74a at the end approached by bars 70. Said portion 74a acts as a cam to depress bars 70.

In operation, table 24 will be intermittently rotated the distance between the axes of adjacent mandrels 27. Means for so rotating the table are shown and described in said copending application. The sheets of flexible material 63 will be successively fed downwardly by the feeding mechanism 20 and said sheets will have their vertical edge portions respectively disposed in the guideways formed by plates 50 and 51 and the plates 59 and 60. The sheet 63 when so positioned has its median line between its vertical edges disposed substantially in the path of the axes of mandrels 27. When the table is moved, the mandrel adjacent sheet 63 will move into engagement with said sheet and will bend said sheet partially about said mandrel. Said mandrel continues its movement with table 24 and the sheet is moved out of said guideway and its edge portions contact the convex side plates 51 and 60 and members 30 and 38 are moved in synchronism with table 24 and the mandrels 27 so that the mandrel 27 with the sheet 63 now wrapped around a considerable portion of its periphery moves into the recesses 30a and 38a and the mandrel comes into the position shown in Fig. 4. The sheet 63 is now pressed against the periphery of the mandrel and the vertical edge portions of the sheet are in overlapped relation, as shown in Fig. 4. At just about the time the mandrel reaches the position shown in Fig. 4, the bar 70 adjacent said mandrel moves from under cam member 74 and the spring 72 forces said bar 70 upwardly and the electrode 67 is moved against the overlapping edge portions of sheet 63 and said edge portions are pressed against each other in overlapping relation and against the mandrel as shown at the mandrel which is to the left of the mandrel between members 30 and 38 in Fig. 4. Electrode 67 is moved against the said overlapping portions and mandrel by the springs 64. As the table 24 makes its next movement, the mandrel moves from between members 30 and 38 and in this movement member 38 may move slightly away from member 30. The provision of members 41 being oscillatable and under the influence of springs 49 causes the sheet to be tightly pressed against the mandrel. The mandrel with the sheet wrapped about it and held against its periphery moves in the successive movements of the table 24 and other parts are added to the cylindrical shell formed by said sheet and operations are performed thereon at the various positions, as shown and described in said copending application. When the electrode 67 is pressed against the overlapping portions of the sheet 63, electric current is passed therethrough and the overlapping portions are heated and the lacquer on these portions becomes adhesive and said overlapping portions are very firmly and tightly sealed together. When the bars 70 again move under the cam bar 74, the bars 70 will be forced downwardly and the cam surfaces 68a will move members 66 and electrode 67 away from the mandrel and to the position shown in most of the said members in Fig. 4.

From the above description it will be seen that I have provided a comparatively simple and very efficient means for wrapping the sheet 63 about the mandrel, pressing the same against the mandrel and sealing the same. The structure is much simpler than that disclosed in the copending application and constitutes a great improvement thereover.

The machine has been amply demonstrated in actual practice, found to be very successful and efficient, and proceedings are in progress to commercially produce the same.

It will of course be understood that various changes may be made in the form, details, arrangement and proportions of the parts, without departing from the scope of applicant's invention which generally stated, consists in a device capable of carrying out the objects above set forth, in the parts and combinations of parts disclosed and defined in the appended claims.

What is claimed is:

1. A container-forming device having in combination, a rotatable table, a series of equally and circumferentially spaced cylindrical mandrels carried by said table and extending with their axes substantially at right angles to said table, means for intermittently rotating said table the distance between adjacent mandrels, means for feeding a sheet of flexible material into position in front of one of said mandrels so that said mandrel engages said sheet in its movement with said table and flexes the same, means for guiding the flexing movement of said sheet to cause it to partially embrace said mandrel, a pair of opposed rotatable members between which said mandrel is moved by said table, said members having recesses in their peripheries shaped to fit about said mandrel, means for rotating said members in synchronism with the movement of said mandrel to press said sheet about said mandrel so that one of its edges overlaps the other, and a second member for pressing said overlapping edges against said mandrel so that said mandrel and said sheet may be moved with said sheet surrounding the same.

2. The structure set forth in claim 1, resilient means for pressing said second member against said edges and mandrel, means for holding said second member away from said sheet and mandrel, and means for releasing said second member so that it is pressed against said sheet by said resilient means.

3. The structure set forth in claim 2, said last two mentioned means comprising a third member respectively secured to said second member, a guide member for said third member, a fourth member movable to move said third member and second member away from said mandrel against the pressure of said resilient means, a cam member for moving said fourth member and a second resilient means for moving said fourth member when away from said cam to permit said first mentioned resilient means to move said second member against said mandrel.

4. A container-forming device having in combination, a rotatable table, a series of equally spaced cylindrical mandrels carried by said table and extending with their axes substantially at right angles to said table, means for intermittently rotating said table the distance between adjacent mandrels, means for feeding a sheet of flexible material, which sheet has a pair of edges substantially parallel to the axes of said mandrels and is coated with a lacquer adjacent said edges, which lacquer is adapted to form an adhesive when heated, said sheet being fed into position in front of one of said mandrels so that it is engaged by said mandrel in its movement with said table and bent about said mandrel, means for guiding the said edges of said sheet, a pair of opposed rotatable members having circumferentially spaced recesses in their peripheries shaped to fit about said mandrel between which members said mandrel is moved, means for rotating said members in synchronism with the movement of said mandrel to cause said members to press said sheet against said mandrel with said edges of said sheet overlapping at the side of said mandrel opposite that first engaging said sheet, an electrode movable to press said overlapping edges together and against said mandrel, and means for heating said electrode to seal said edges together by said heated lacquer.

5. A container-forming device having in combination, a pair of opposed spaced rotatable members having circumferentially spaced recesses formed in their peripheries, a cylindrical mandrel having a periphery about which said recesses fit and being movable in a path between said members, means for feeding a sheet of flexible material in position adjacent said mandrel to be moved thereby and bent partially thereabout, means for rotating said members in synchronism with the movement of said mandrel for causing said members to press said sheet against said mandrel with the edges of said sheet overlapping, and additional means for pressing said edges against said mandrel.

6. A container-forming device having in combination, a rotatable table, a series of equally and circumferentially spaced cylindrical mandrels carried by said table and extending with their axes vertically from said table, means for intermittently rotating said table the distance between adjacent mandrels, spaced guideways, means for feeding a rectangular sheet of flexible material into said guideways, said sheet extending across the path of said mandrels so that it will be engaged substantially at its center by a mandrel moving with said table and will be bent partially about said mandrel, curved guide plates for controlling the vertical edge portions of said sheet, a pair of opposed spaced rotatable members having circumferentially spaced recesses in their peripheries adapted to fit the periphery of said mandrel, means for rotating said members in synchronism with the movement of said mandrel with said table to cause said members to press said sheet about said mandrel with said vertical edges overlapping, a second member carried by said table movable to engage said edges and press the same against said mandrel.

7. A container-forming device having in combination, a rotatable table, a series of equally and circumferentially spaced cylindrical mandrels carried by said table and extending with their axes vertically from said table, means for intermittently rotating said table the distance between adjacent mandrels, spaced stationary guideways, means for successively feeding rectangular sheets of flexible material with the vertical edge portions of said sheets respectively received in said guideways, said sheets extending across the path of said mandrels so that each sheet is engaged substantially at its central portion by a mandrel in the movement of said mandrel with said table, a pair of spaced rotatable members beyond said guideways in the movement of said table having circumferentially spaced recesses in their peripheries adapted to fit the periphery of said mandrels respectively, means for rotating said members in synchronism with the movement of said table and mandrels whereby said members press said sheets respectively about the periphery of said mandrels respectively with the edge portions of said sheets overlapping a second member carried on said table adjacent each of said mandrels, and means for moving said second member to press said edge portions against said mandrels respectively.

8. The structure set forth in claim 7, a resilient means for each of said second members urging said members to move toward said mandrels respectively, means for holding said members away from said mandrels, and means for releasing said second members when said sheets are folded about said mandrels by said pair of rotatable members so that said second members may engage said edges.

9. A container-forming device having in combination, a pair of opposed spaced rotatable members having recesses in their peripheries, a mandrel the periphery of which said recesses fit movable in a circular path and between said members, means for feeding a rectangular sheet of flexible material in front of said mandrel in position to be engaged by said mandrel substantially at its central portion and moved by said mandrel, means for rotating said pair of members in synchronism with the movement of said mandrel to cause said members to press said sheet about said mandrel and against the periphery thereof with the vertical edges of said sheet overlapping, and a second member movable with said mandrel and further movable relatively to said mandrel to press said overlapping edges against said mandrel.

10. The structure set forth in claim 9, a third member secured to and extending horizontally from said second member, a guide member movable with said mandrel through which said third member moves, a vertically movable bar movable with said mandrel having a cam surface thereon for moving said third member and second member, and a cam beneath which said bar moves for pressing said bar downwardly and moving said third member and second member away from said mandrel, and a second resilient means for moving said bar upwardly when moved away from said cam for permitting said first mentioned resilient means to move said second and third members toward said mandrel.

11. The structure set forth in claim 5, one of said members being carried on a shaft coaxial therewith, a third member in which said shaft is journaled, a fourth member into which said shaft extends, said fourth member being swingable about an axis spaced from the axis of said shaft whereby said shaft and said one of said first mentioned members can be swung to and from a mandrel.

12. The structure set forth in claim 11, a resilient means tending to swing said fourth member to move said one of said first mentioned members towards said mandrel.

13. A container-forming device having in combination, a rotatable table, a series of equally and circumferentially spaced mandrels secured to and extending substantially at right angles to said table, means for intermittently rotating said table the distance between adjacent mandrels, means for feeding a sheet of flexible material into position in front of one of said mandrels so that said mandrel engages said sheet in its movement with said table and flexes the same, a pair of opposed rotatable members between which said mandrel is moved by said table, said members having recesses in their peripheries shaped to fit about said mandrel, means for rotating said members in synchronism with the movement of said mandrel to press said sheet about said mandrel so that one of its edges overlaps the other, a shaft coaxial with one of said first mentioned members on which said latter member is carried, a pair of spaced members through which the end portions of said shaft extend, a second pair of vertically spaced members, coaxial pivots about which said last mentioned members are swingable, the axes of said pivots being spaced from the axis of said shaft whereby said one of said first mentioned members and shaft can be swung to and from a mandrel.

14. The structure set forth in claim 13, and a resilient means for swinging said last mentioned members for moving said one of said first mentioned members toward said mandrel.

(References on following page)

References Cited in the file of this patent

UNITED STATES PATENTS

| Number | Name | Date |
|---|---|---|
| 987,829 | Schubert | Mar. 28, 1911 |
| 1,444,096 | Beadle | Feb. 6, 1923 |
| 1,620,796 | Blankenhorn | Mar. 15, 1927 |

FOREIGN PATENTS

| Number | Country | Date |
|---|---|---|
| 363,878 | Germany | Nov. 14, 1922 |